United States Patent
Harada et al.

(10) Patent No.: US 9,063,340 B2
(45) Date of Patent: *Jun. 23, 2015

(54) OBJECTIVE OPTICAL SYSTEM AND ENDOSCOPE USING SAME

(71) Applicant: FUJIFILM Corporation, Tokyo (JP)

(72) Inventors: Keisuke Harada, Saitama-ken (JP); Yoshiaki Ishii, Saitama-ken (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/266,080

(22) Filed: Apr. 30, 2014

(65) Prior Publication Data

US 2014/0233113 A1    Aug. 21, 2014

Related U.S. Application Data

(63) Continuation of application No. PCT/JP2012/006973, filed on Oct. 31, 2012.

(30) Foreign Application Priority Data

Nov. 1, 2011 (JP) .................. 2011-240151

(51) Int. Cl.
*G02B 9/34* (2006.01)
*G02B 23/24* (2006.01)

(52) U.S. Cl.
CPC ............. *G02B 23/243* (2013.01); *G02B 9/34* (2013.01)

(58) Field of Classification Search
CPC ................. G02B 23/243; G02B 9/34
USPC .......................................................... 359/781
See application file for complete search history.

(56) References Cited

U.S. PATENT DOCUMENTS

| 5,175,650 A | 12/1992 | Takayama et al. |
| 6,994,668 B2 | 2/2006 | Miyano |
| 7,907,352 B2 | 3/2011 | Miyano |

(Continued)

FOREIGN PATENT DOCUMENTS

| JP | 63-261213 | 10/1988 |
| JP | 02-293709 | 12/1990 |

(Continued)

OTHER PUBLICATIONS

NPL English Language Translation of International Preliminary Report on Patentability Chapter I prepared for PCT/JP2012/006973 on May 6, 2014.*

(Continued)

*Primary Examiner* — David N Spector
(74) *Attorney, Agent, or Firm* — Young & Thompson

(57) ABSTRACT

An objective optical system includes: a negative first lens group; an aperture stop; and a positive second lens group, provided in this order from an object side. The first lens group includes a first lens, which is a negative single lens, and a cemented lens formed by cementing a positive lens and a negative lens together, provided in this order from the object side. The second lens group includes a fourth lens, which is a positive single lens, and a cemented lens formed by cementing a positive lens and a negative lens together, provided in this order from the object side. The objective optical system satisfies Conditional Formula (1): f1/f<1.1, wherein f1 is the focal length of the lens provided most toward the object side, and f is the focal length of the entire lens system.

18 Claims, 13 Drawing Sheets

(56) References Cited

U.S. PATENT DOCUMENTS

| | | | |
|---|---|---|---|
| 8,896,940 B2 * | 11/2014 | Harada | 359/753 |
| 8,902,515 B2 * | 12/2014 | Harada et al. | 359/753 |
| 2004/0125469 A1 | 7/2004 | Miyano | |
| 2008/0249367 A1 | 10/2008 | Miyano | |
| 2009/0086017 A1 | 4/2009 | Miyano | |
| 2009/0237807 A1 | 9/2009 | Sasamoto | |
| 2010/0305405 A1 | 12/2010 | Miyano | |

FOREIGN PATENT DOCUMENTS

| | | |
|---|---|---|
| JP | 2004-205779 | 7/2004 |
| JP | 2008-257108 | 10/2008 |
| JP | 2008-257109 | 10/2008 |
| JP | 2009-080413 | 4/2009 |
| JP | 2009-223183 | 10/2009 |
| JP | 2010-276923 | 12/2010 |
| JP | 2011-145315 | 7/2011 |

OTHER PUBLICATIONS

NPL English Language Translation of PCT/JP2012/006973 as originally filed on Oct. 31, 2012.*

International Search Report, PCT/JP2012/006973, Mar. 5, 2013.

* cited by examiner

EXAMPLE 1

FIG.3  EXAMPLE 2
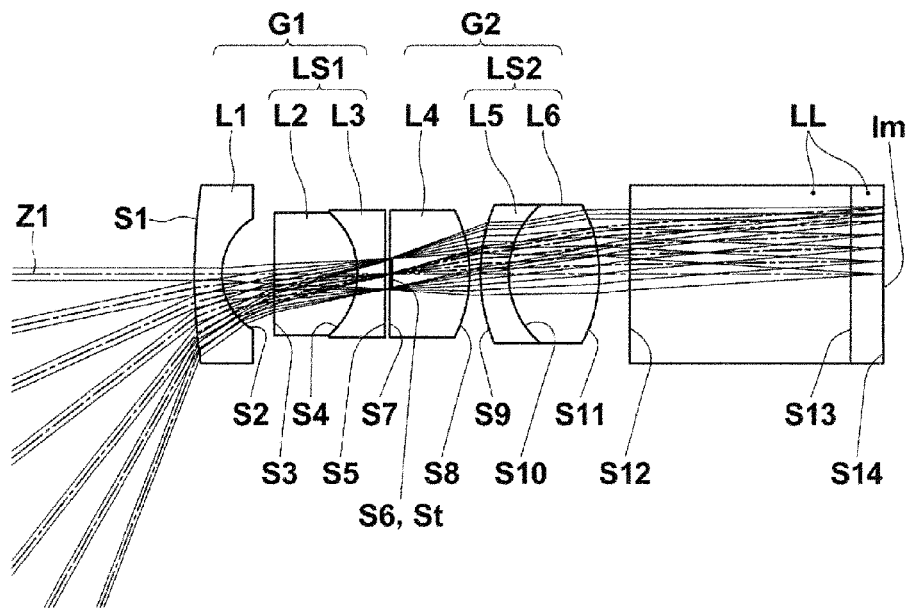
FIG.4  EXAMPLE 3
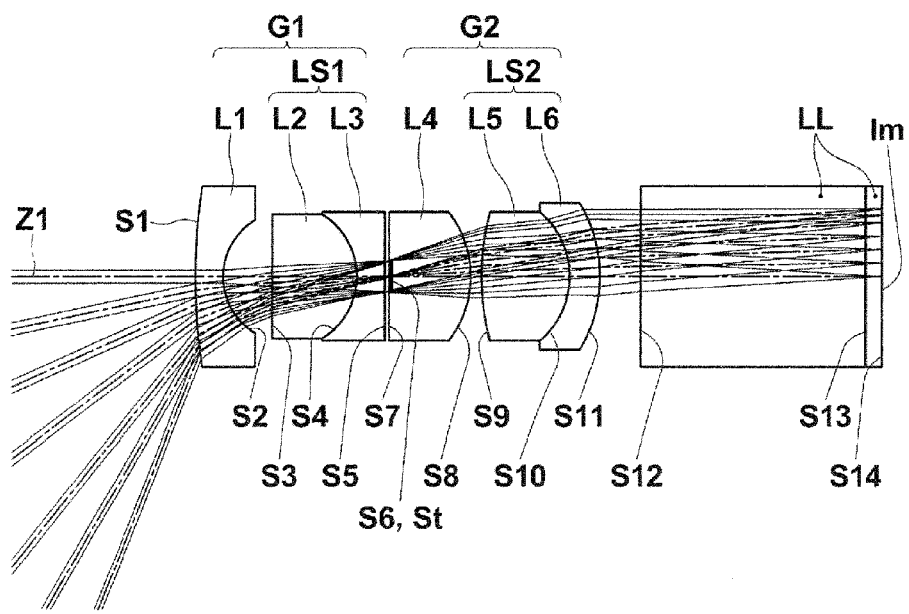

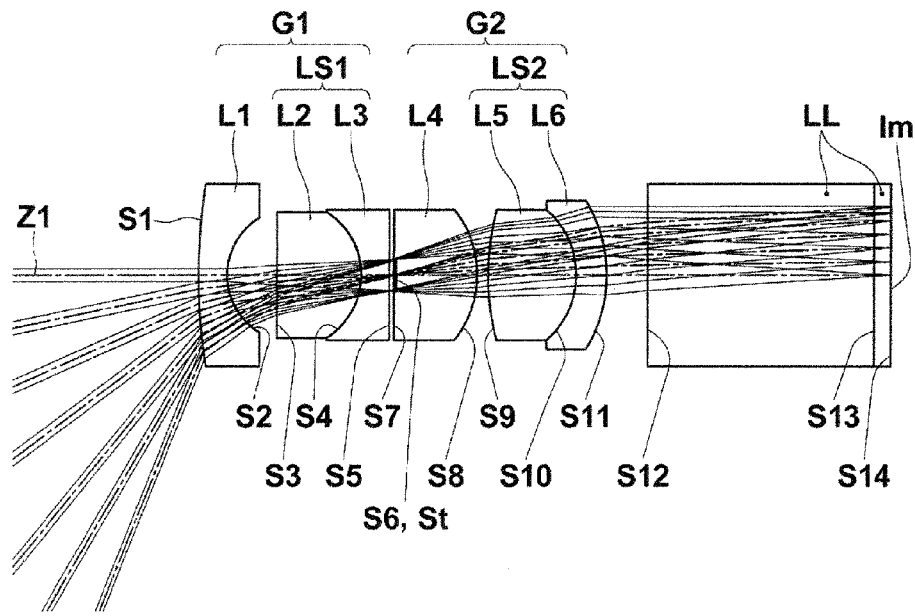
FIG.5  EXAMPLE 4
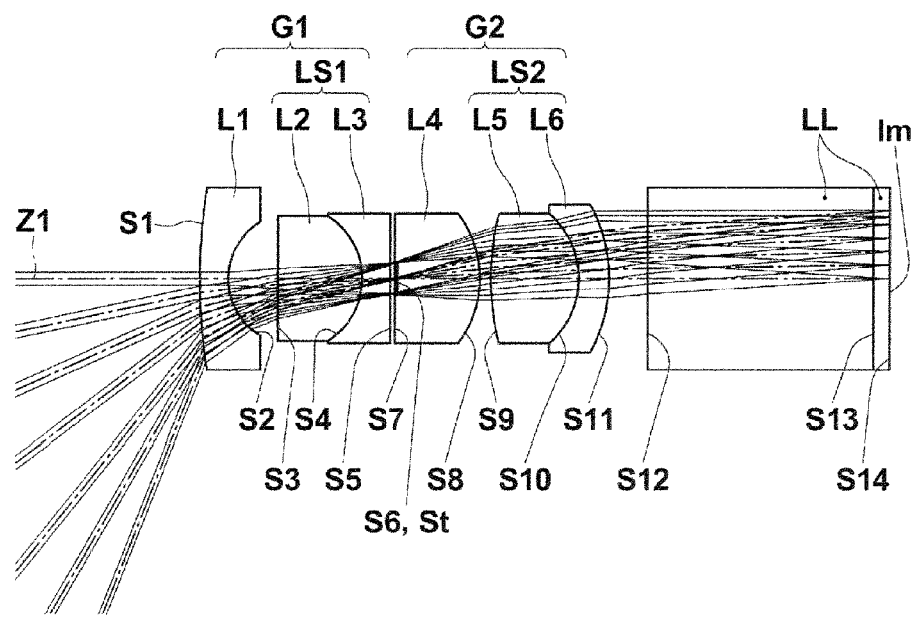
FIG.6  EXAMPLE 5

EXAMPLE 6

EXAMPLE 7

FIG.10
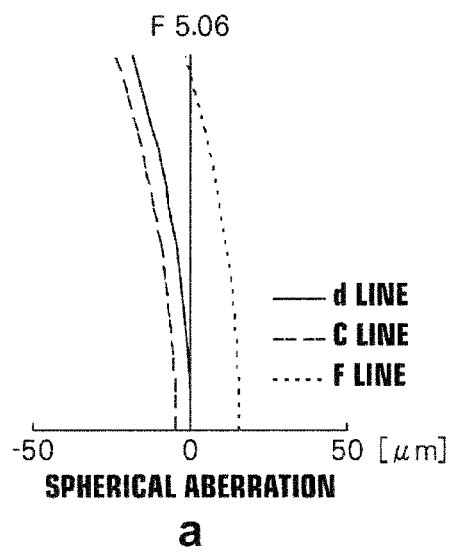
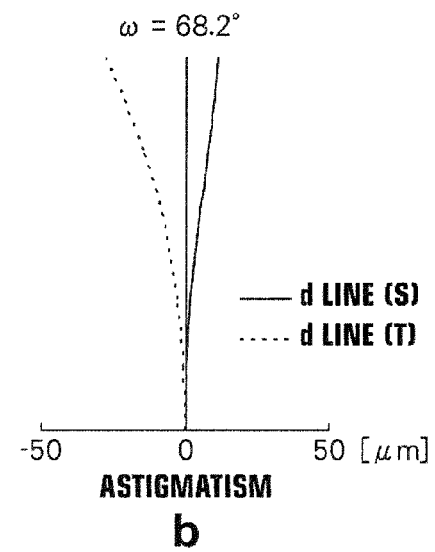
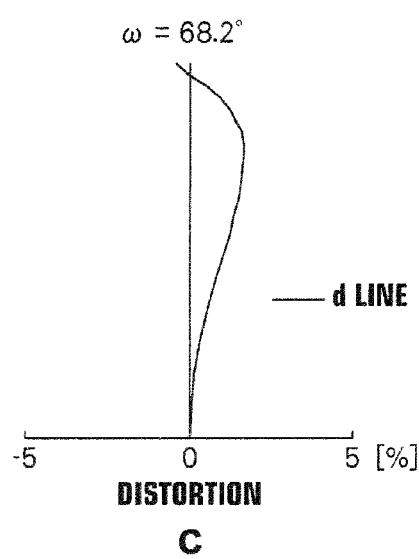
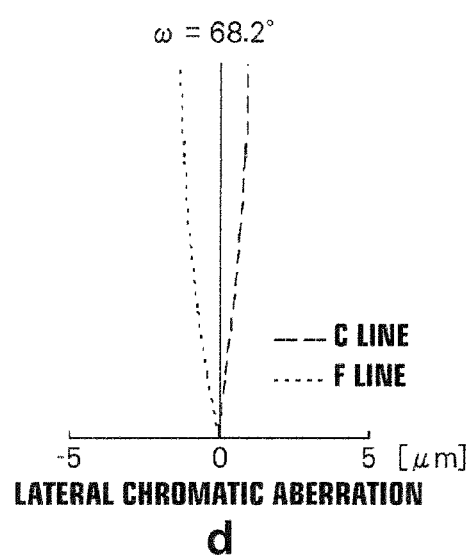

FIG.11
EXAMPLE 2
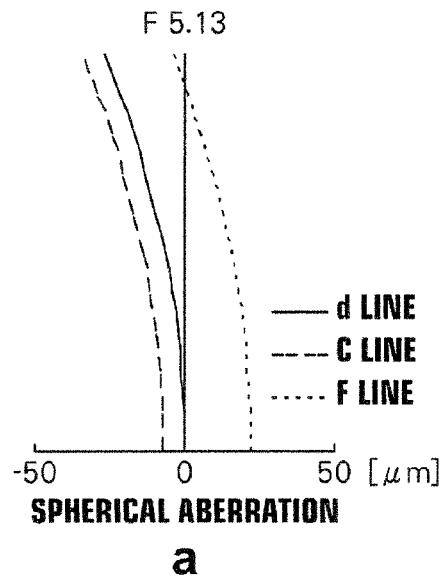
a  SPHERICAL ABERRATION
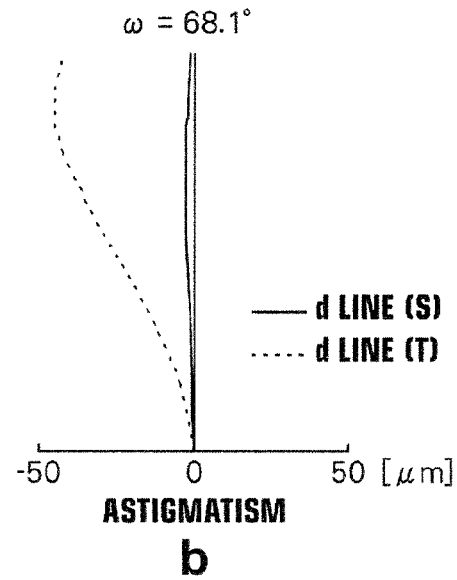
b  ASTIGMATISM
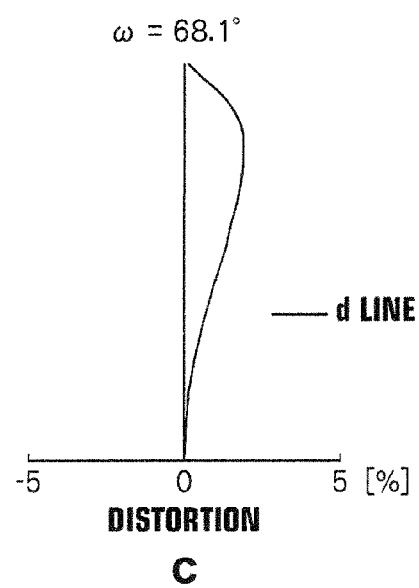
c  DISTORTION
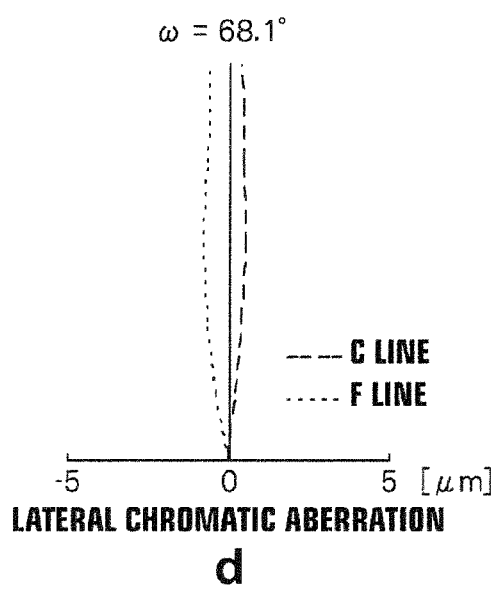
d  LATERAL CHROMATIC ABERRATION

FIG.12
EXAMPLE 3
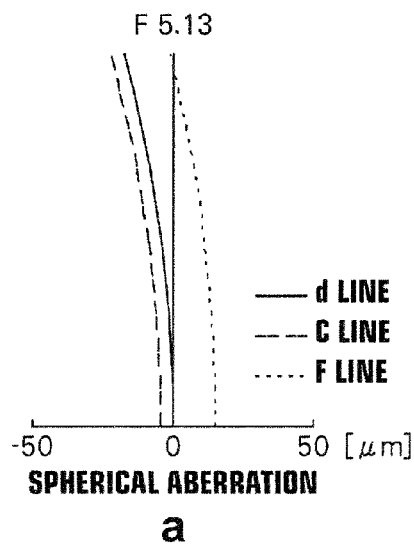
a  SPHERICAL ABERRATION
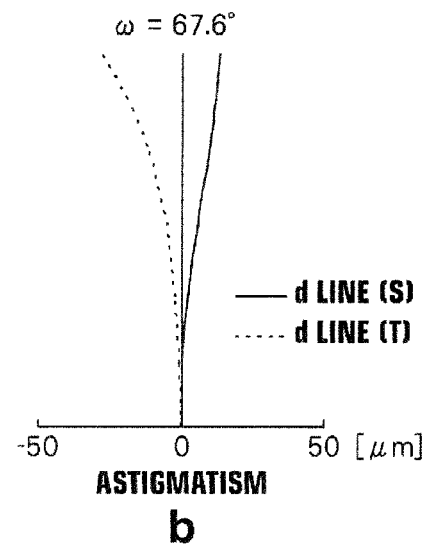
b  ASTIGMATISM
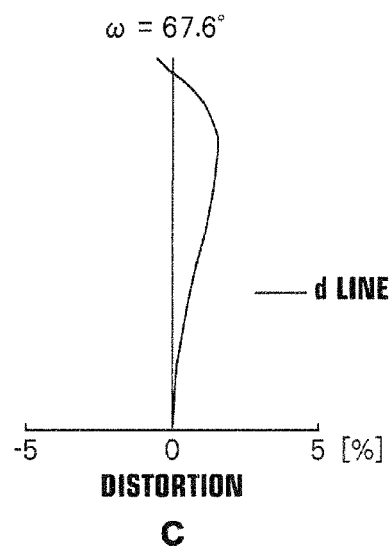
c  DISTORTION
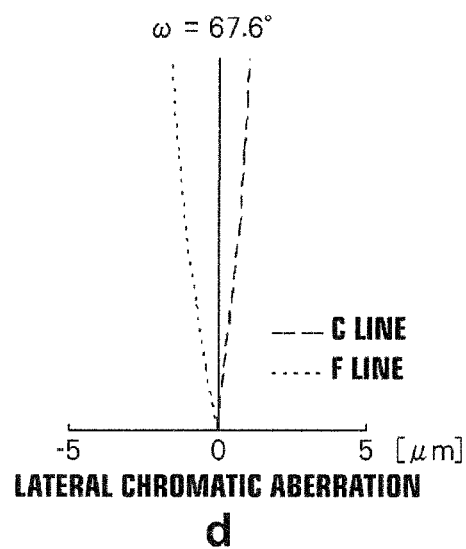
d  LATERAL CHROMATIC ABERRATION

FIG.13
EXAMPLE 4
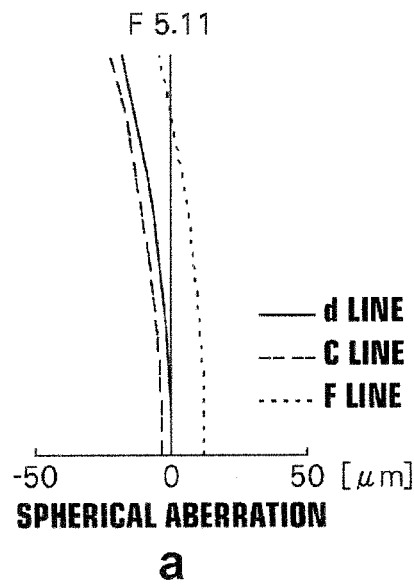
a
SPHERICAL ABERRATION
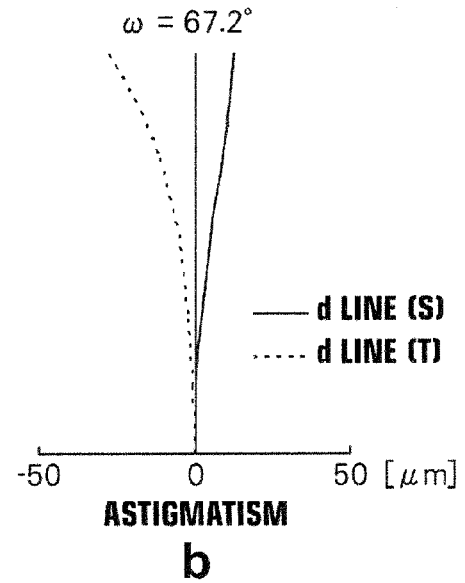
b
ASTIGMATISM
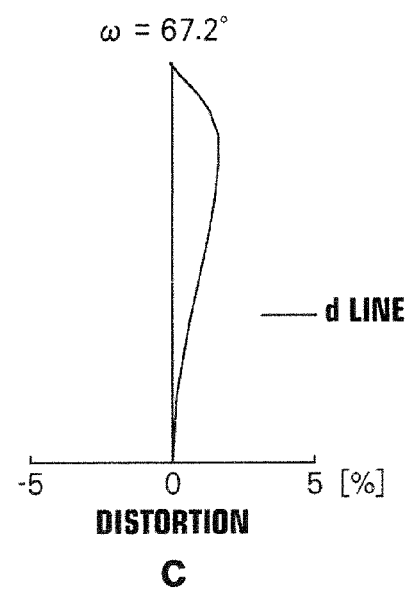
c
DISTORTION
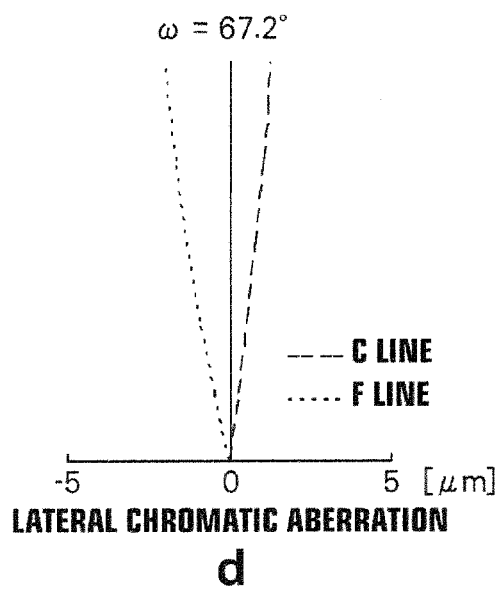
d
LATERAL CHROMATIC ABERRATION

FIG.14
EXAMPLE 5
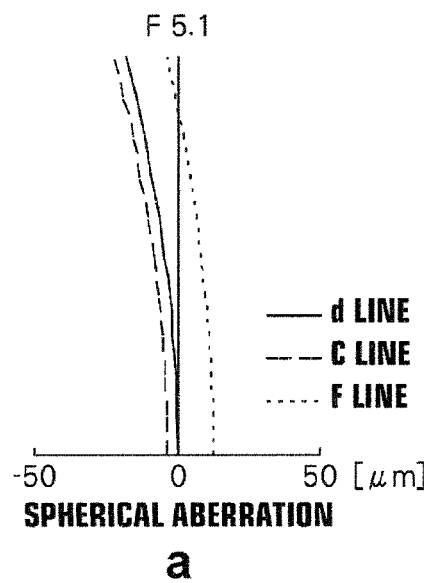
a
SPHERICAL ABERRATION
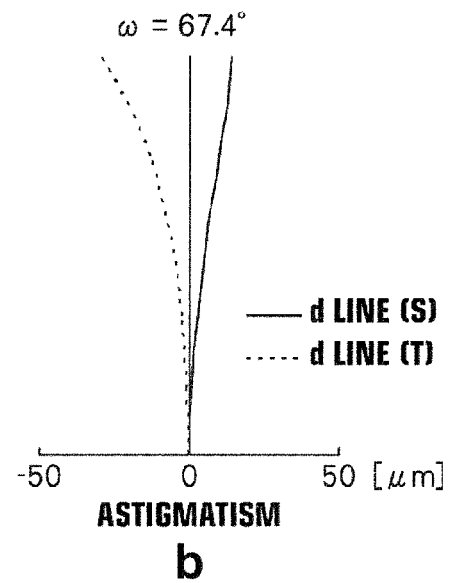
b
ASTIGMATISM
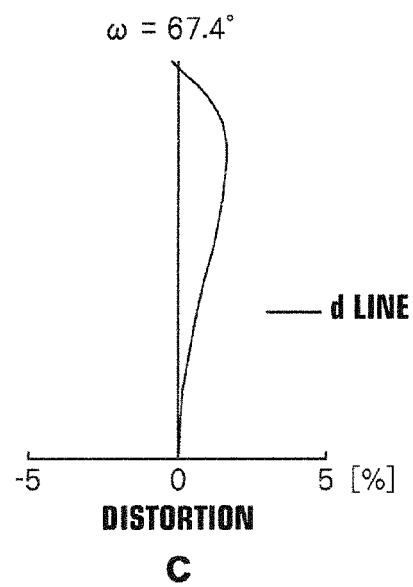
c
DISTORTION
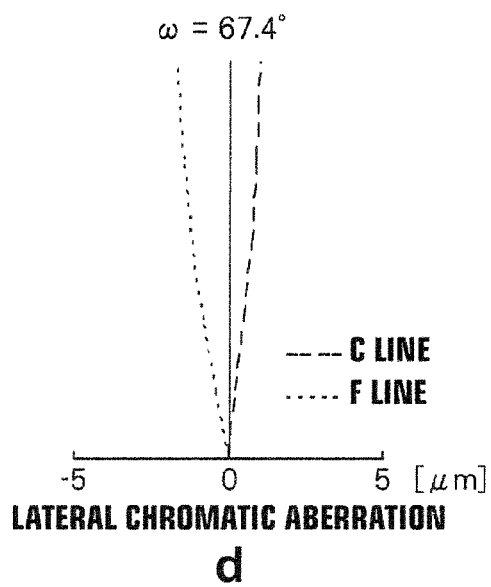
d
LATERAL CHROMATIC ABERRATION

FIG.15
EXAMPLE 6
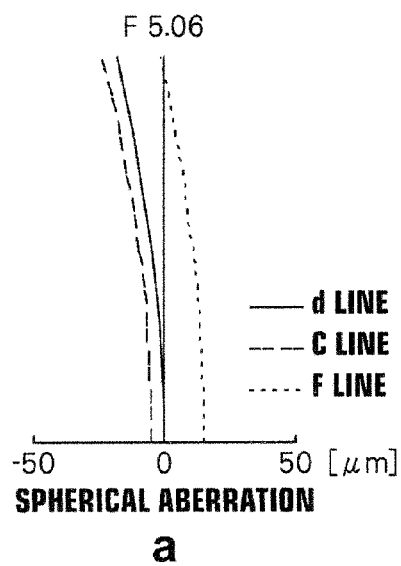
a
SPHERICAL ABERRATION
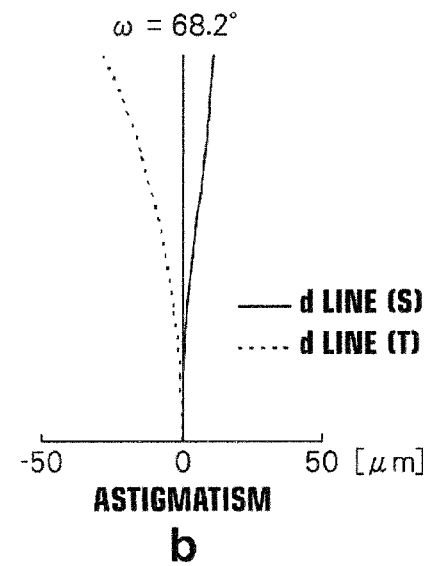
b
ASTIGMATISM
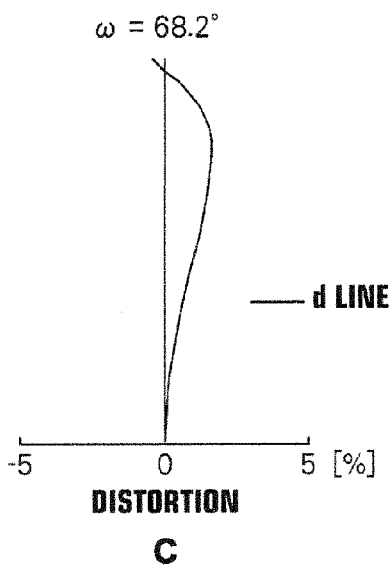
c
DISTORTION
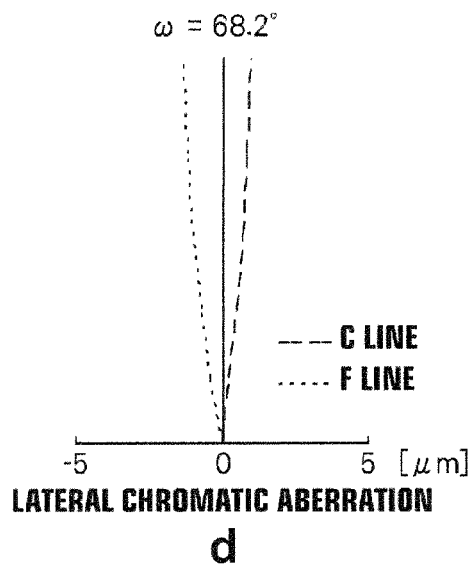
d
LATERAL CHROMATIC ABERRATION

FIG.16
EXAMPLE 7
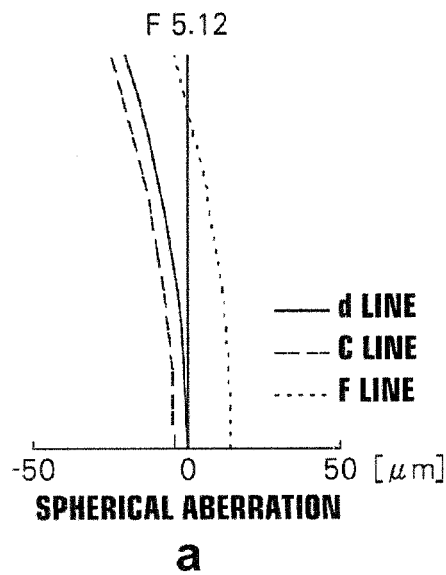
a  SPHERICAL ABERRATION
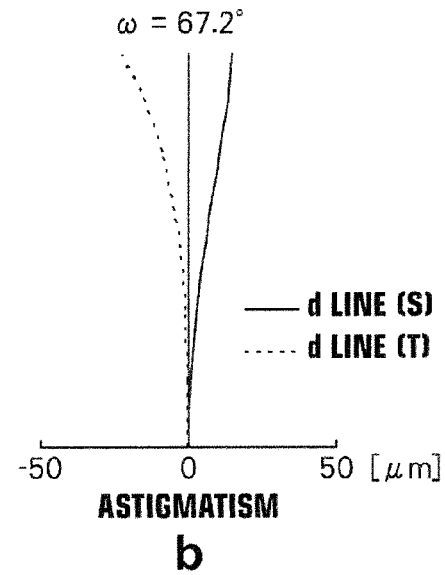
b  ASTIGMATISM
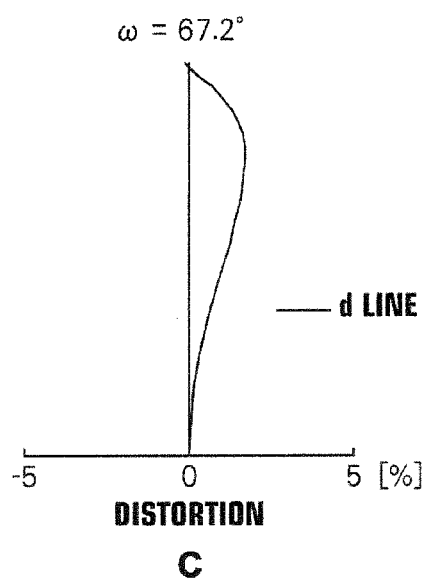
c  DISTORTION
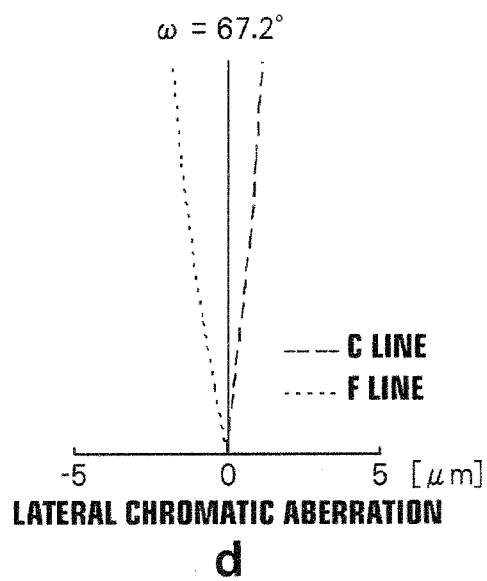
d  LATERAL CHROMATIC ABERRATION

FIG.17
EXAMPLE 8
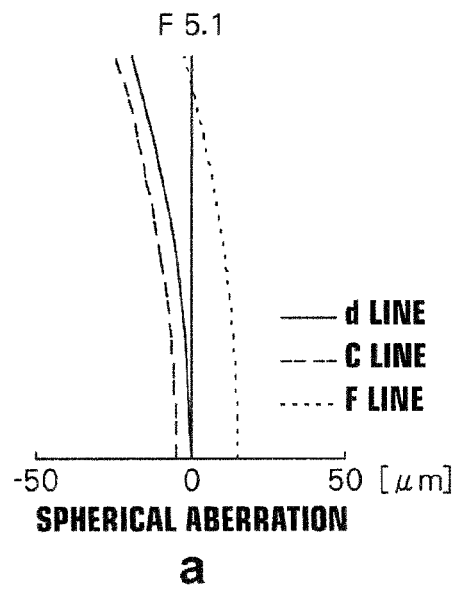
a  SPHERICAL ABERRATION
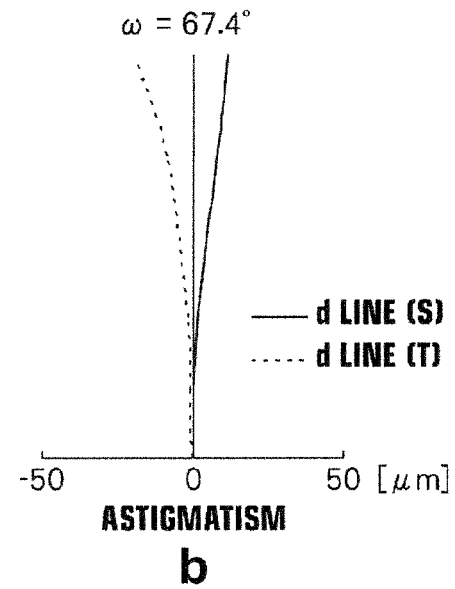
b  ASTIGMATISM
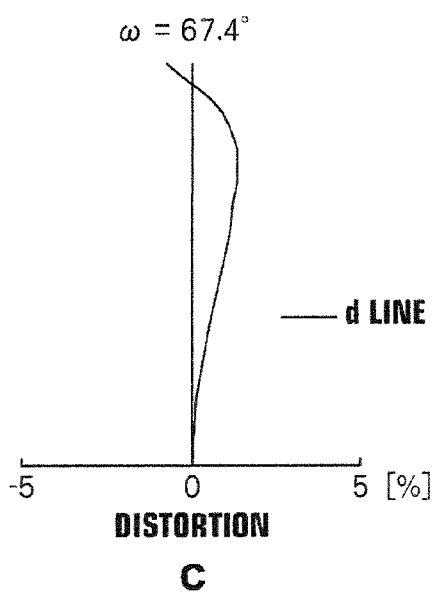
c  DISTORTION
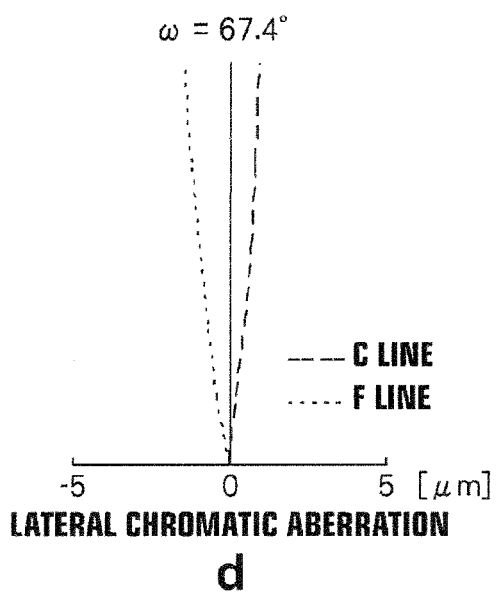
d  LATERAL CHROMATIC ABERRATION

OBJECTIVE OPTICAL SYSTEM AND ENDOSCOPE USING SAME

TECHNICAL FIELD

The present invention is related to an objective optical system having a first lens group and a second lens group, with an aperture stop interposed therebetween. The present invention is also related to an endoscope that employs such an objective optical system.

DESCRIPTION OF THE RELATED ART

Conventionally, there has been demand for miniaturization of objective optical systems having large angles of view which are employed in endoscopes for observing the interiors of body cavities. Objective optical systems which are configured to have cemented lenses with an aperture stop interposed therebetween in order to correct lateral chromatic aberrations are known as such objective optical systems. Further, there are known objective optical systems in which the thicknesses of lenses provided more toward the object side than an aperture stop are decreased, or single lenses are employed instead of cemented lenses, in order to reduce the dimensions of the objective optical systems in the direction of the optical axes thereof in order to achieve a reduction in size. Still further, there are known objective optical systems which are designed such that the heights of light rays that pass through a lens provided most toward the object side is decreased, in order to decrease the dimensions (outer diameters) in a direction perpendicular to the optical axis, in order to achieve a reduction in size (refer to Japanese Unexamined Patent Publication Nos. 2008-257108, 2008-257109, and 2004-205779)

DISCLOSURE OF THE INVENTION

There is demand to decrease the dimensions of lenses and optical members, for example, an optical path converting prism, which are provided more toward the image side than the aperture stops in the direction perpendicular to the optical axis thereof (the radial direction) in the aforementioned objective optical systems having large angles of view, in order to further miniaturize endoscopes. In order to meet this demand, it will be necessary to decrease the outer diameters of the cemented lenses provide more toward the image side than the aperture stop without decreasing the angle of view or increasing the occurrence of aberrations, and also to decrease the heights of light rays which are output from objective optical systems toward the image side and focused as images.

The present invention has been developed in view of the foregoing circumstances. The object of the present invention is to provide an objective optical system that can be miniaturized without decreasing optical performance. It is another object of the present invention to provide an endoscope that employs such an objective optical system.

A first objective optical system of the present invention comprises:
a first lens group having a negative refractive power;
an aperture stop; and
a second lens group having a positive refractive power, provided in this order from an object side;
the first lens group comprising a negative single lens and a cemented lens formed by cementing a positive lens and a negative lens together, provided in this order from the object side;
the second lens group comprising a positive single lens and a cemented lens formed by cementing a positive lens and a negative lens together, provided in this order from the object side; and
the objective optical system satisfying Conditional Formula (1) below:

$$f1/f < -1.1 \qquad (1)$$

wherein f1 is the focal length of the lens provided most toward the object side, and f is the focal length of the entire lens system.

A second objective optical system of the present invention comprises:
a first lens group having a negative refractive power;
an aperture stop; and
a second lens group having a positive refractive power, provided in this order from an object side;
the first lens group comprising a negative single lens and a cemented lens formed by cementing a positive lens and a negative lens together, provided in this order from the object side;
the second lens group comprising a positive single lens and a cemented lens formed by cementing a positive lens and a negative lens together, provided in this order from the object side; and
the objective optical system satisfying Conditional Formula (2) below:

$$2.95 < f4/f \qquad (2)$$

wherein f4 is the focal length of the positive single lens within the second lens group, and f is the focal length of the entire lens system.

A third objective optical system of the present invention comprises:
a first lens group having a negative refractive power;
an aperture stop; and
a second lens group having a positive refractive power, provided in this order from an object side;
the first lens group comprising a negative single lens and a cemented lens formed by cementing a positive lens and a negative lens together, provided in this order from the object side;
the second lens group comprising a positive single lens and a cemented lens formed by cementing a positive lens and a negative lens together, provided in this order from the object side; and
the objective optical system satisfying Conditional Formula (3) below:

$$f(RN)/f < -3.6 \qquad (3)$$

wherein f(RN) is the focal length of the negative lens in the cemented lens within the second lens group, and f is the focal length of the entire lens system.

A fourth objective optical system of the present invention comprises:
a first lens group having a negative refractive power;
an aperture stop; and
a second lens group having a positive refractive power, provided in this order from an object side;
the first lens group comprising a negative single lens and a cemented lens having a negative refractive power, formed by cementing a positive lens and a negative lens together, provided in this order from the object side;
the second lens group comprising a positive single lens and a cemented lens having a positive refractive power, formed by cementing a positive lens and a negative lens together, provided in this order from the object side; and the objective optical system simultaneously satisfying Conditional Formulae (4) and (5) below:

$$-5 < f(RN)/f < -2 \quad (4)$$

$$1.6 < f(RP)/f < 2 \quad (5)$$

wherein f(RN) is the focal length of the negative lens in the cemented lens within the second lens group, f(RP) is the focal length of the positive lens in the cemented lens within the second lens group, and f is the focal length of the entire lens system.

The cemented lens within the first lens group may be formed by a positive lens having a convex surface toward the image side, and a negative lens, provided in this order from the object side.

The cemented lens within the second lens group may be formed by a positive lens and a negative meniscus lens having a convex surface toward the image side, provided in this order from the object side.

The cemented lens within the second lens group may be formed by a negative lens and a positive lens having a convex surface toward the image side, provided in this order from the object side.

It is desirable for the second, third, and fourth objective optical systems of the present invention to satisfy Conditional Formula (1) below:

$$f1/f < -1.1 \quad (1)$$

wherein f1 is the focal length of the lens provided most toward the object side, and f is the focal length of the entire lens system.

It is desirable for the first through fourth objective optical systems of the present invention to satisfy Conditional Formula (6) below:

$$1.92 < f2-6/f < 3 \quad (6)$$

wherein f2-6 is the combined focal length of the lenses other than the lens most toward the object side, and f is the focal length of the entire lens system.

The first through fourth objective optical systems of the present invention may be employed as the objective optical system of an endoscope.

An endoscope of the present invention is equipped with one of the first through fourth objective optical systems of the present invention.

The objective optical systems of the present invention substantially consist of two lens groups. Note that the expression "substantially consist of two lens groups" refers to cases including those in which the objective optical systems also include other components, such as lenses that practically do not have any power, optical elements other than lenses such as aperture stops and cover glasses, and mechanical components such as lens flanges, a lens barrel, an imaging device, and a blur correcting mechanism.

The objective optical systems of the present invention substantially consist of six lenses Note that the expression "substantially consist of six lenses" refers to cases including those in which the objective optical systems also include other components, such as lenses that practically do not have any power, optical elements other than lenses such as aperture stops and cover glasses, and mechanical components such as lens flanges, a lens barrel, an imaging device, and a blur correcting mechanism.

As described above, the objective optical systems of the present invention may be constituted only by two lens groups and six lenses. Alternatively, the objective optical systems of the present invention may also include lenses that practically do not have any power and optical elements other than lenses, in addition to the two lens groups and the six lenses.

Note that with respect to the number of lenses in cases that cemented lenses are included, cemented lenses formed by cementing n lenses together will be counted as n lenses.

A single lens refers to one lens. That is, the expression "single lens" refers to an individual which is not cemented to another lens.

In the case that aspherical surfaces are employed in the objective optical systems of the present invention, the convexities and concavities of the aspherical surfaces, the signs of refractive powers, and the radii of curvature of the aspherical surfaces will be defined as those in the paraxial regions thereof.

Note that the expression "negative lens" refers to a lens having a negative refractive power, and the expression "positive lens" refers to a lens having a positive refractive power.

In the first, second, and third objective optical systems of the present invention and the endoscopes that employ these objective optical systems, the first lens group having the negative refractive power, the aperture stop, and the second lens group having the positive refractive power are provided in this order from the object side. The first lens group is constituted by the negative single lens and the cemented lens formed by cementing the negative lens and the positive lens together, provided in this order from the object side. The second lens group is provided with the positive single lens and the cemented lens formed by cementing the positive lens and the negative lens together, provided in this order from the object side. Further, the first objective optical system of the present invention is configured to satisfy Conditional Formula (1): f1/f<-1.1, the second objective optical system of the present invention is configured to satisfy Conditional Formula (2): 2.95<f4/f, and the third objective optical system is configured to satisfy Conditional Formula (3): f(RN)/f<-3.6. Therefore, the outer diameters of the cemented lenses provided more toward the image side than the aperture stop can be decreased, and the heights of light rays that are emitted from the objective optical systems toward the image side and form images can be decreased in all of the first, second, and third objective optical systems of the present invention. Thereby, miniaturization can be achieved without decreasing optical performance.

Further, widening of the angle of view (to a range from 130 degrees to 140 degrees) becomes possible by configuring the first objective optical system of the present invention and the endoscope that employs the first objective optical system to satisfy Conditional Formula (1): f1/f<-1.1.

If the value of f1/f is greater than the upper limit defined in Conditional Formula (1), the heights of rays of light that pass through the negative single lens provided most toward the object side will become high, although the angle of view can be increased. Therefore, it will become necessary to increase the outer diameter of the negative single lens. Meanwhile, if the value of f1/f is less than the lower limit defined in Conditional Formula (1), the angel of view will decrease, and will not contribute to a desired widening of the angle of view.

In addition, the diameter of the cemented lens provided more toward the image side than the aperture stop can be reduced, by configuring the second objective optical system of the present invention and the endoscope that employs the second objective optical system to satisfy Conditional Formula (2): 2.95<f4/f.

If the value of f4/f is greater than the upper limit defined in Conditional Formula (2), the angle of view will decrease, and will not contributed to a desired widening of the angle of view. Meanwhile, if the value of f4/f is less than the lower limit defined in Conditional Formula (2), the heights of rays of light that pass through the cemented lens provided more toward the image side than the positive single lens within the second lens group will become high, and it will become necessary to increase the outer diameter of the cemented lens. Therefore, it will become difficult to decrease the outer diameter of the cemented lens provided more toward the image side than the aperture stop.

In addition, the outer diameter of the negative lens that constitutes the cemented lens provided more toward the image side than the aperture stop can be decreased while suppressing the occurrence of field curvature, by configuring the third objective optical system of the present invention and the endoscope that employs the third objective optical system to satisfy Conditional Formula (3): $f(RN)/f < -3.6$. This negative lens has a greater sensitivity to field curvature with respect to changes in focal length (the degree of change in the field curvature) compared to the other lenses. Therefore, it is necessary to simultaneously correct the field curvature and to decrease the diameter of the negative lens. Note that if the value of $f(RN)/f$ is greater than the upper limit defined in Conditional Formula (3), the field curvature will be overcorrected (excessively corrected).

In the fourth objective optical system of the present invention and the endoscope that employs the fourth objective optical system, the first lens group having a negative refractive power, the aperture stop, and the second lens group having the positive refractive power are provided in this order from the object side. The first lens group is provided with the negative single lens and the cemented lens having a negative refractive power, formed by cementing the positive lens and the negative lens together, provided in this order from the object side. The second lens group is provided with the positive single lens and the cemented lens having a positive refractive power, formed by cementing the positive lens and the negative lens together, provided in this order from the object side. The fourth objective optical system of the present invention is configured to simultaneously satisfy Conditional Formulae (4): $-5 < f(RN)/f < -2$ and (5): $1.6 < f(RP)/f < 2$. Therefore, the outer diameter of the cemented lens provided more toward the image side than the aperture stop can be decreased, and the heights of light rays which are output from objective optical systems toward the image side and focused as images can be decreased. Thereby, a reduction in size can be achieved without decreasing optical performance.

The outer diameter of the negative lens that constitutes the cemented lens provided more toward the image side than the aperture stop can be decreased while suppressing the occurrence of field curvature, by configuring the fourth objective optical system and the endoscope that employs the fourth objective optical system to satisfy Conditional Formula (4): $-5 < f(RN)/f < -2$. This negative lens has a greater sensitivity to field curvature with respect to changes in focal length (the degree of change in the field curvature) compared to the other lenses. Therefore, it is necessary to simultaneously correct the field curvature and to decrease the diameter of the negative lens. If the value of $f(RN)/f$ is greater than the upper limit defined in Conditional Formula (4), the field curvature will be overcorrected (excessively corrected). Meanwhile, if the value of $f(RN)/f$ is less than the lower limit defined in Conditional Formula (4), the back focus will become short, and the field curvature will be undercorrected (insufficiently corrected).

A desired widening of the angle of view and a desired amount of back focus can be achieved, by configuring the fourth objective optical system of the present invention and the endoscope that employs the fourth objective optical system to satisfy Conditional Formula (4), and further to satisfy Conditional Formula (5): $1.6 < f(RP)/f < 2$.

If the value of $f(RP)/f$ is greater than the upper limit defined in Conditional Formula (5), the angle of view will decrease, and will not contribute to a desired widening of the angle of view. Meanwhile, if the value of $f(RP)/f$ is less than the lower limit defined in Conditional Formula (5), the amount of back focus will decrease, and it will become difficult to place other optical members, such as an optical path converting prism, toward the image side of the objective optical system.

BRIEF DESCRIPTION OF THE DRAWINGS

FIG. 3 is a sectional diagram that illustrates the schematic configuration of an objective optical system of Example 2 along with the paths of light rays.

FIG. 4 is a sectional diagram that illustrates the schematic configuration of an objective optical system of Example 3 along with the paths of light rays.

FIG. 5 is a sectional diagram that illustrates the schematic configuration of an objective optical system of Example 4 along with the paths of light rays.

FIG. 6 is a sectional diagram that illustrates the schematic configuration of an objective optical system of Example 5 along with the paths of light rays.

FIG. 10 is collection of diagrams that illustrate aberrations of the objective optical system of Example 1.

FIG. 11 is collection of diagrams that illustrate aberrations of the objective optical system of Example 2.

FIG. 12 is collection of diagrams that illustrate aberrations of the objective optical system of Example 3.

FIG. 13 is collection of diagrams that illustrate aberrations of the objective optical system of Example 4.

FIG. 14 is collection of diagrams that illustrate aberrations of the objective optical system of Example 5.

FIG. 15 is collection of diagrams that illustrate aberrations of the objective optical system of Example 6.

FIG. 16 is collection of diagrams that illustrate aberrations of the objective optical system of Example 7.

FIG. 17 is collection of diagrams that illustrate aberrations of the objective optical system of Example 8.

BEST MODE FOR CARRYING OUT THE INVENTION

Hereinafter, objective optical systems of the present invention and endoscopes that employ the objective optical systems will be described with reference to the attached drawings.

Figure 1:
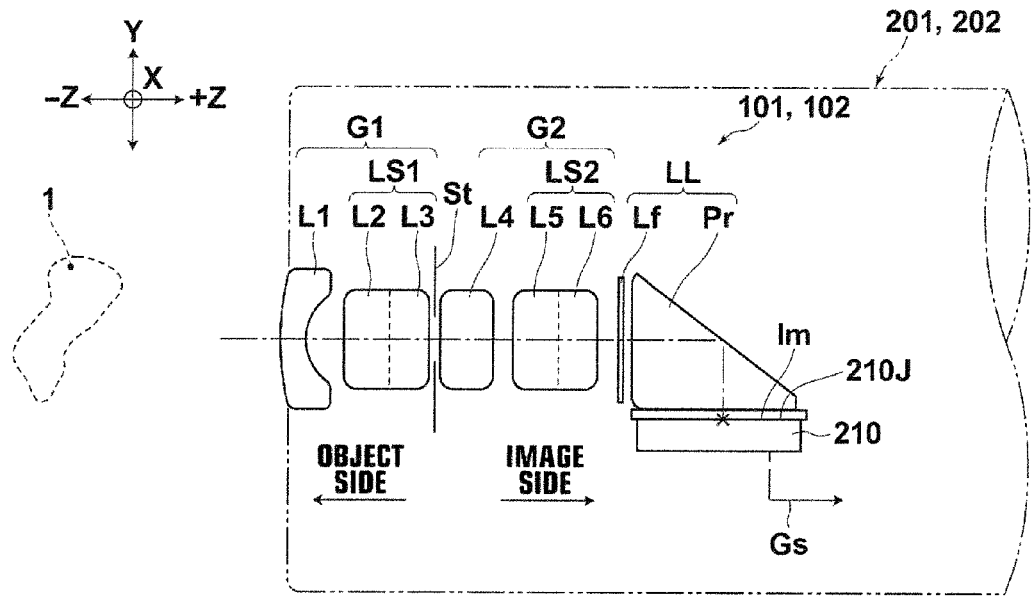
FIG. 1 is a sectional diagram that illustrates the schematic configuration of an endoscope equipped with an objective optical system according to an embodiment of the present invention.

FIG. 1 is a sectional diagram that schematically illustrates the common structure among an objective optical system according to a first embodiment of the present invention through an objective optical system according to a fourth embodiment of the present invention and endoscopes equipped with the four types of objective optical systems. Note that arrows X, Y, and Z in FIG. 1 indicate three directions which are perpendicular to each other, and the arrow Z indicates the same direction as that of an optical axis Z1. Note that the optical axis Z1 is an axis that matches a straight line that passes through the center of curvature of the surfaces of each of the lenses that constitute the objective optical system.

Note that the four types of objective optical systems 101 through 104 corresponding to the first through fourth embodiments are also collectively referred to as an objective optical system 100. In addition, the four types of endoscopes 201 through 204 corresponding to the first through fourth embodiments are also collectively referred to as an endoscope 200.

The endoscope 200 illustrated in FIG. 1 is equipped with an imaging device 210, which is a solid state imaging device such as a CCD and a CMOS, and the objective optical system 101. Note that FIG. 1 illustrates the distal end of a portion of an endoscope to be inserted into a body cavity.

Light that propagates along the optical axis Z1, which is determined with respect to the single focus objective optical system 101 is deflected 90 degrees in a direction toward the imaging device 210 by an optical path converting prism Pr. A light receiving surface 210J of the imaging device 210 is provided parallel with respect to the optical axis Z1.

The imaging device 210 converts an optical image Im that represents a subject 1, which passes through the single focus objective optical system 100 and is focused on the light receiving surface 210J, into electrical signals, and outputs image signals Gs that represent the optical image Im.

The objective optical system 100 is constituted by a first lens group G1 having a negative refractive power, an aperture stop St, and a second lens group G2 having a positive refractive power, in this order from the object side (the side of the −Z direction in FIG. 1). The first lens group G1 is provided with a first lens L1, which is a single lens having a negative refractive power, and a cemented lens LS1 formed by cementing a lens having a positive refractive power and a lens having a negative refractive power together, in this order from the object side. The second lens group G2 is provided with a fourth lens L4, which is a single lens having a positive refractive power, and a cemented lens LS2 formed by cementing a lens having a positive refractive power and a lens having a negative refractive power together, in this order from the object side.

The objective optical system 100 is not limited to use in endoscopes, and may be employed as an objective lens in other apparatuses.

Note that the objective optical system 101 of the first embodiment satisfies Conditional Formula (1): f1/f<−1.1, in addition to having the configuration described above regarding the objective optical system 100. Here, f1 is the focal length of the lens provided most toward the object side, and f is the focal length of the entire lens system.

It is desirable for the objective optical system 101 of the first embodiment to satisfy Conditional Formula (1a): −1.5<f1/f<−1.1, and more desirable for the objective optical system 101 of the first embodiment to satisfy Conditional Formula (1b): −1.4<f1/f<−1.2.

Note that the operational effects regarding Conditional Formulae (1a) and (1b) are the same as those described previously regarding Conditional Formula (1).

In addition, the objective optical system 102 of the second embodiment satisfies Conditional Formula (2): 2.95<f4/f, in addition to having the configuration described above regarding the objective optical system 100. Here, f4 is the focal length of the positive single lens within the second lens group, and f is the focal length of the entire lens system.

It is desirable for the objective optical system 102 of the second embodiment to satisfy Conditional Formula (2a): 3<f4/f<6, and more desirable for the objective optical system 102 of the second embodiment to satisfy Conditional Formula (2b): 3<f4/f<5.

Note that the operational effects regarding Conditional Formulae (2a) and (2b) are the same as those described previously regarding Conditional Formula (2).

In addition, the objective optical system 103 of the third embodiment satisfies Conditional Formula (3): f(RN)/f<−3.6, in addition to having the configuration described above regarding the objective optical system 100. Here, f(RN) is the focal length of the negative lens in the cemented lens within the second lens group, and f is the focal length of the entire lens system.

It is desirable for the objective optical system 103 of the third embodiment to satisfy Conditional Formula (3a): −5<f(RN)/f<−3.7, and more desirable for the objective optical system 103 of the third embodiment to satisfy Conditional Formula (3b): −4.5<f(RN)/f<−3.8.

If the value of f(RN)/f is greater than the upper limit defined in Conditional Formula (3), field curvature will be overcorrected (excessively corrected). Meanwhile, if the value of f(RN) If is less than the lower limit defined in Conditional Formula (3), the back focus will become short, and field curvature will be undercorrected (insufficiently corrected). Note that the operational effects regarding Conditional Formulae (3a) and (3b) are the same as those described previously regarding Conditional Formula (3).

Further, in the objective optical system 104 of the fourth embodiment, the cemented lens LS1 within the first lens group G1 has a negative refractive power as a whole, and the cemented lens LS2 within the second lens group G2 has a positive refractive power as a whole, in addition to having the configuration described above regarding the objective optical system 100. In addition, the objective optical system 104 simultaneously satisfies Conditional Formula (4): −5<f(RN)/f<−2 and Conditional Formula (5): 1.6<f(RP)/f<2. Here, f(RN) is the focal length of the negative lens in the cemented lens within the second lens group, f(RP) is the focal length of the positive lens in the cemented lens within the second lens group, and f is the focal length of the entire lens system.

It is desirable for the objective optical system 104 of the fourth embodiment to satisfy Conditional Formula (4a): −4.5<f(RN)/f<−2.5, and more desirable for the objective optical system 104 of the fourth embodiment to satisfy Conditional Formula (4b): −4.3<f(RN)/f<−3.

It is desirable for the objective optical system 104 of the fourth embodiment to satisfy Conditional Formula (5a): 1.64<f(RP)/f<1.9, and more desirable for the objective optical system 104 of the fourth embodiment to satisfy Conditional Formula (5b): 1.66<f(RP)/f<1.85.

Note that the operational effects regarding Conditional Formulae (4a) and (4b) are the same as those described previously regarding Conditional Formula (4). In addition, the operational effects regarding Conditional Formulae (5a) and (5b) are the same as those described previously regarding Conditional Formula (5).

In the objective optical system 100 (101 through 104), the cemented lens LS1 within the first lens group G1 may be formed by a second lens L2, which is a lens having a positive refractive power and a convex surface toward the image side (the side toward the +Z direction in FIG. 1), and a third lens L3, which is a lens having a negative refractive power, provided in this order from the object side. In the case that the second lens L2 has a convex surface toward the image side and a positive refractive power, the back focus will be sufficiently long. Thereby, insertion of optical elements LL having no power, such as the optical path converting prism Pr and a filter Lf into the optical path corresponding to the back focus will be facilitated.

In the objective optical system 100 (101 through 104), the cemented lens LS2 within the second lens group G2 may be formed by a fifth lens L5 having a positive refractive power and a sixth lens L6, which is a meniscus lens having a negative refractive power and a convex surface toward the image side, provided in this order from the object side. By configuring the cemented lens LS2 in this manner, favorable telecentric properties can be obtained, and principal rays of light can be caused to enter the light receiving surface 210J of the imaging device 210 substantially perpendicularly.

In the objective optical system 100 (101 through 104), the cemented lens LS2 within the second lens group G2 may alternatively be formed by a fifth lens L5 having a negative refractive power and a sixth lens L6 having a positive refractive power and a convex surface toward the image side, provided in this order from the object side. By configuring the cemented lens LS2 in this manner, favorable telecentric properties can be obtained as in the case described above, and principal rays of light can be caused to enter the light receiving surface 210J of the imaging device 210 substantially perpendicularly.

In addition, it is desirable for the objective optical systems 102, 103, and 104 to satisfy Conditional Formula (1): f1/f<−1.1, more desirable for the objective optical systems 102, 103, and 104 to satisfy Conditional Formula (1a): −1.5<f1/f<−1.1, and even more desirable for the objective optical systems 102, 103, and 104 to satisfy Conditional Formula (1b): −1.4<f1/f<−1.2. Note that the operational effects of Conditional Formulae (1), (1a), and (1b) are the same as the operational effects of Conditional Formula (1), described previously in relation with the objective optical system 101.

In addition, it is desirable for the objective optical system 100 (101, 102, 103, and 104) to satisfy Conditional Formula (6): 1.92<f2-6/f<3, more desirable for the objective optical system 100 to satisfy Conditional Formula (6a): 1.92<f2-6/f<2.6, and even more desirable for the objective optical system 100 to satisfy Conditional Formula (6b): 1.92<f2-6/f<2.2. Here, f2-6 is the combined focal length of the lenses other than the first lens L1 provided most toward the object side, and f is the focal length of the entire lens system. That is, f2-6 is the combined focal length of the second lens L2, the third lens L3, the fourth lens L4, the fifth lens L5, and the sixth lens L6.

If the value of f2-6/f is greater than the upper limit defined in Conditional Formula (6), the angle of view will become small, and it will become difficult to achieve a widening of the angle of view desired for the objective optical system 100. Meanwhile, if the value of f2-6/f is less than the lower limit defined in Conditional Formula (6), the back focus will become short, and insertion of optical elements LL having no power, (for example, the optical path converting prism Pr and the filter Lf) into the optical path corresponding to the back focus will become difficult. Note that the operational effects of Conditional Formulae (6a) and (6b) are the same as those described above.

EXAMPLES

Next, Examples 1 through 8, which indicate data of specific numerical values of the objective optical system of the present invention, will be described with reference to FIGS. 2 through 9, FIGS. 10 through 17, Tables 1 through 8, and Table 9.

Note that reference numerals within FIGS. 2 through 9 that match the reference numerals in FIG. 1 indicate corresponding constituent elements.

Example 1

Figure 2:
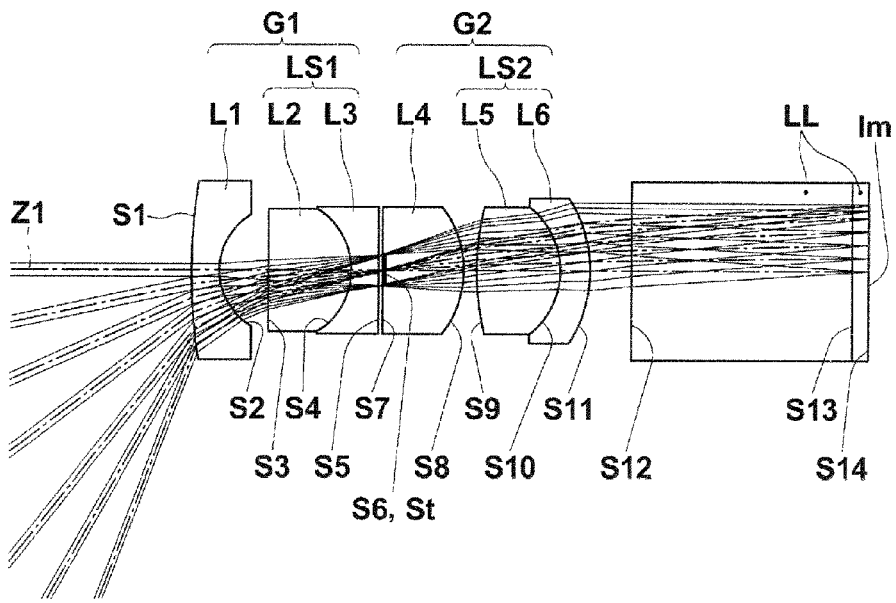
FIG. 2 is a sectional diagram that illustrates the schematic configuration of an objective optical system of Example 1 along with the paths of light rays.

FIG. 2 is a sectional diagram that illustrates the schematic configuration of an objective optical system of Example 1 along with the paths of light rays that pass through the objective optical system.

The objective optical system of Example 1 corresponds to the first through fourth embodiments described above, and is configured to satisfy all of Conditional Formulae (1) through (6). A cemented lens LS2 within a second lens group G2 of the objective optical system of Example 1 differs from that of an objective optical system of Example 2 to be described later, in that the cemented lens LS2 is formed by a fifth lens L5 having a positive refractive power and a sixth lens L6, which is a meniscus lens having a negative refractive power and a convex surface toward the image side, provided in this order from the object side.

Table 1 shows lens data of the objective optical system of Example 1. In the lens data shown in Table 1, surface numbers Si (i=1, 2, 3, . . . ) are surface numbers that sequentially increase from the object side to the image side, with the surface provided most toward the object side designated as 1. Note that the lens data also include surface numbers of an aperture stop St, optical elements LL (for example, an optical path converting prism, a filter, etc.) that do not have any power, and an imaging surface on which the optical image Im is focused.

The symbol Ri in Table 1 indicates the radii of curvature of $i^{th}$ (i=1, 2, 3, . . . ) surfaces. The symbol Di indicates the distances between $i^{th}$ surfaces and $i+1^{st}$ surfaces along the optical axis Z1. The numbers of the values indicated for the symbol Ri and the symbol Si correspond to the numbers of the symbol Si (i=1, 2, 3, . . . ) that indicate lens surfaces, the aperture stop, etc. Note that in Table 1, the units of measurement for the radii of curvature and the distances among surfaces are mm. The signs of the radii of curvature are positive in the case that surfaces are convex toward the object side, and negative in the case that surfaces are convex toward the image side.

The symbol Ndj in Table 1 indicates the refractive indices of $j^{th}$ (j=1, 2, 3, . . . ) optical elements with respect to the d line (wavelength: 587.6 nm), and vdj indicates the Abbe's numbers of $j^{th}$ optical elements with respect to the d line. j is a number that sequentially increases from the object side to the image side, with the optical element most toward the object side designated as 1.

Note that it is possible for optical systems such as that described above to be proportionately enlarged or proportionately reduced and utilized. Therefore, objective optical systems in which the entirety of the aforementioned lens data is proportionately enlarged or proportionately reduced may be Examples of the present invention as well.

TABLE 1

Example 1: Lens Data

| Surface Number (i) | Radius of Curvature (Ri) | Distance (Di) | Ndj | vdj |
|---|---|---|---|---|
| 1 | 4.9998 | 0.25 | 1.88300 | 40.80 |
| 2 | 0.5800 | 0.44 | | |
| 3 | ∞ | 0.75 | 1.72825 | 28.50 |
| 4 | −0.6452 | 0.25 | 1.88300 | 40.80 |
| 5 | ∞ | 0.04 | | |
| 6 (Aperture Stop) | ∞ | 0.00 | | |
| 7 | ∞ | 0.73 | 1.51633 | 64.10 |
| 8 | −0.9258 | 0.12 | | |
| 9 | 2.4390 | 0.76 | 1.62041 | 60.30 |
| 10 | −0.7143 | 0.27 | 2.10205 | 16.80 |
| 11 | −1.1886 | 0.37 | | |
| 12 | ∞ | 2.00 | 1.55920 | 53.90 |
| 13 | ∞ | 0.15 | 1.51633 | 64.10 |
| 14 | ∞ | 0.00 | | |

FIG. 10 is a collection of diagrams that illustrate aberrations regarding the objective optical system of Example 1. a of FIG. 10 illustrates spherical aberration, b of FIG. 10 illustrates astigmatism, c of FIG. 10 illustrates distortion, and d of FIG. 10 illustrates lateral chromatic aberration.

Note that in the diagram that illustrates astigmatism, the solid line indicates aberration in a sagittal direction, and the broken line indicates aberration in a tangential direction. In addition, "F5.06" shown above the diagram that illustrates spherical aberration indicates that the F number is 5.06. "ω=68.2°" shown above the diagrams that illustrate other aberrations indicate that the half angle of view is 68.2°.

Further, values of the objective optical system of Example 1 that correspond to the equations and variables in each of the conditional formulae described above are shown in Table 9. The values of the equations and variables can be derived from the lens data shown in Table 1 and the like. Note that the focal lengths of the lenses corresponding to the variables within the equations, and the focal lengths of combinations of a plurality of lenses (combined focal lengths) are distinguished as positive and negative.

Table 9 also shows values of objective optical systems of Examples 2 through 8 to be described later that correspond to the equations and variables in each of the conditional formulae described above.

As can be understood from the lens data and the like, the objective optical system of Example 1 can be miniaturized without decreasing optical performance.

The manners in which FIG. 2 that illustrates the configuration, FIG. 10 that illustrates the aberrations, Table 1 that shows the lens data, and Table 9 related to the conditional formulae of the objective optical system of Example 1 are to be interpreted are the same as those for the figures and tables related to Examples 2 through 8 to be described later. Therefore, descriptions thereof will be omitted with respect to the Examples to be described later.

Example 2

FIG. 3 is a sectional diagram that illustrates the schematic configuration of an objective optical system of Example 2 along with the paths of light rays that pass through the objective optical system.

The objective optical system of Example 2 corresponds to the first, second, and fourth embodiments described above, and is configured to satisfy Conditional Formulae (1), (2), (4), (5), and (6), but not Conditional Formula (3). A cemented lens LS2 within a second lens group G2 of the objective optical system of Example 2 differs from that of the objective optical system of Example 1, in that the cemented lens LS2 is formed by a fifth lens L5 having a negative refractive power and a sixth lens L6, which is a lens having a positive refractive power and a convex surface toward the image side, provided in this order from the object side.

FIG. 11 is a collection of diagrams that illustrate aberrations of the objective optical system of Example 2.

Table 2 below shows lens data of the objective optical system of Example 2.

TABLE 2

Example 2: Lens Data

| Surface Number (i) | Radius of Curvature (Ri) | Distance (Di) | Ndj | vdj |
|---|---|---|---|---|
| 1 | 5.3203 | 0.25 | 1.88300 | 40.80 |
| 2 | 0.5800 | 0.48 | | |
| 3 | ∞ | 0.75 | 1.72825 | 28.50 |
| 4 | −0.7127 | 0.25 | 1.88300 | 40.80 |
| 5 | ∞ | 0.04 | | |
| 6 (Aperture Stop) | ∞ | 0.00 | | |
| 7 | ∞ | 0.73 | 1.51633 | 64.10 |
| 8 | −1.2431 | 0.10 | | |
| 9 | 1.6189 | 0.25 | 1.95906 | 17.50 |
| 10 | 0.8124 | 0.82 | 1.62041 | 60.30 |
| 11 | −1.3016 | 0.28 | | |
| 12 | ∞ | 2.00 | 1.55920 | 53.90 |
| 13 | ∞ | 0.30 | 1.51633 | 64.10 |
| 14 | ∞ | 0.00 | | |

As can be understood from the lens data and the like, the objective optical system of Example 2 can be miniaturized without decreasing optical performance.

Example 3

FIG. 4 is a sectional diagram that illustrates the schematic configuration of an objective optical system of Example 3 along with the paths of light rays that pass through the objective optical system.

The objective optical system of Example 3 corresponds to the first through fourth embodiments described above, and is configured to satisfy all of Conditional Formulae (1) through (6). A cemented lens LS2 within a second lens group G2 of the objective optical system of Example 3 is the same as that of Example 1. That is, the cemented lens LS2 is formed by a fifth lens L5 having a positive refractive power and a sixth lens L6, which is a meniscus lens having a negative refractive power and a convex surface toward the image side, provided in this order from the object side.

FIG. 12 is a collection of diagrams that illustrate aberrations of the objective optical system of Example 3.

Table 3 below shows lens data of the objective optical system of Example 3.

TABLE 3

Example 3: Lens Data

| Surface Number (i) | Radius of Curvature (Ri) | Distance (Di) | Ndj | νdj |
|---|---|---|---|---|
| 1 | 5.2535 | 0.25 | 1.88300 | 40.80 |
| 2 | 0.5800 | 0.44 | | |
| 3 | ∞ | 0.75 | 1.72825 | 28.50 |
| 4 | −0.6452 | 0.25 | 1.88300 | 40.80 |
| 5 | ∞ | 0.04 | | |
| 6 (Aperture Stop) | ∞ | 0.00 | | |
| 7 | ∞ | 0.73 | 1.51633 | 64.10 |
| 8 | −0.9202 | 0.10 | | |
| 9 | 2.3148 | 0.78 | 1.62041 | 60.30 |
| 10 | −0.7407 | 0.27 | 2.10205 | 16.80 |
| 11 | −1.2428 | 0.37 | | |
| 12 | ∞ | 2.00 | 1.55920 | 53.90 |
| 13 | ∞ | 0.15 | 1.51633 | 64.10 |
| 14 | ∞ | 0.00 | | |

As can be understood from the lens data and the like, the objective optical system of Example 3 can be miniaturized without decreasing optical performance.

Example 4

FIG. 5 is a sectional diagram that illustrates the schematic configuration of an objective optical system of Example 4 along with the paths of light rays that pass through the objective optical system.

The objective optical system of Example 4 corresponds to the first through fourth embodiments described above, and is configured to satisfy all of Conditional Formulae (1) through (6). A cemented lens LS2 within a second lens group G2 of the objective optical system of Example 4 is the same as that of Example 1. That is, the cemented lens LS2 is formed by a fifth lens L5 having a positive refractive power and a sixth lens L6, which is a meniscus lens having a negative refractive power and a convex surface toward the image side, provided in this order from the object side.

FIG. 13 is a collection of diagrams that illustrate aberrations of the objective optical system of Example 4.

Table 4 below shows lens data of the objective optical system of Example 4.

TABLE 4

Example 4: Lens Data

| Surface Number (i) | Radius of Curvature (Ri) | Distance (Di) | Ndj | νdj |
|---|---|---|---|---|
| 1 | 4.9998 | 0.25 | 1.88300 | 40.80 |
| 2 | 0.5800 | 0.44 | | |
| 3 | ∞ | 0.75 | 1.72825 | 28.50 |
| 4 | −0.6452 | 0.25 | 1.88300 | 40.80 |
| 5 | ∞ | 0.04 | | |

TABLE 4-continued

Example 4: Lens Data

| Surface Number (i) | Radius of Curvature (Ri) | Distance (Di) | Ndj | vdj |
|---|---|---|---|---|
| 6 (Aperture Stop) | ∞ | 0.00 | | |
| 7 | ∞ | 0.73 | 1.51633 | 64.10 |
| 8 | −0.9127 | 0.10 | | |
| 9 | 2.3104 | 0.78 | 1.62041 | 60.30 |
| 10 | −0.7407 | 0.27 | 2.15400 | 17.20 |
| 11 | −1.2209 | 0.36 | | |
| 12 | ∞ | 2.00 | 1.55920 | 53.90 |
| 13 | ∞ | 0.15 | 1.51633 | 64.10 |
| 14 | ∞ | 0.00 | | |

As can be understood from the lens data and the like, the objective optical system of Example 4 can be miniaturized without decreasing optical performance.

Example 5

FIG. 6 is a sectional diagram that illustrates the schematic configuration of an objective optical system of Example 5 along with the paths of light rays that pass through the objective optical system.

The objective optical system of Example 5 corresponds to the first through fourth embodiments described above, and is configured to satisfy all of Conditional Formulae (1) through (6). A cemented lens LS2 within a second lens group G2 of the objective optical system of Example 5 is the same as that of Example 1. That is, the cemented lens LS2 is formed by a fifth lens L5 having a positive refractive power and a sixth lens L6, which is a meniscus lens having a negative refractive power and a convex surface toward the image side, provided in this order from the object side.

FIG. 14 is a collection of diagrams that illustrate aberrations of the objective optical system of Example 5.

Table 5 below shows lens data of the objective optical system of Example 5.

TABLE 5

Example 5: Lens Data

| Surface Number (i) | Radius of Curvature (Ri) | Distance (Di) | Ndj | vdj |
|---|---|---|---|---|
| 1 | 4.9998 | 0.25 | 1.88300 | 40.80 |
| 2 | 0.5800 | 0.44 | | |
| 3 | ∞ | 0.75 | 1.72825 | 28.50 |
| 4 | −0.6452 | 0.25 | 1.88300 | 40.80 |
| 5 | ∞ | 0.04 | | |
| 6 (Aperture Stop) | ∞ | 0.00 | | |
| 7 | ∞ | 0.75 | 1.51633 | 64.10 |
| 8 | −0.9350 | 0.10 | | |
| 9 | 2.3735 | 0.78 | 1.62041 | 60.30 |
| 10 | −0.7407 | 0.27 | 1.94595 | 18.00 |
| 11 | −1.3308 | 0.34 | | |
| 12 | ∞ | 2.00 | 1.55920 | 53.90 |
| 13 | ∞ | 0.15 | 1.51633 | 64.10 |
| 14 | ∞ | 0.00 | | |

As can be understood from the lens data and the like, the objective optical system of Example 5 can be miniaturized without decreasing optical performance.

Example 6

Figure 7:
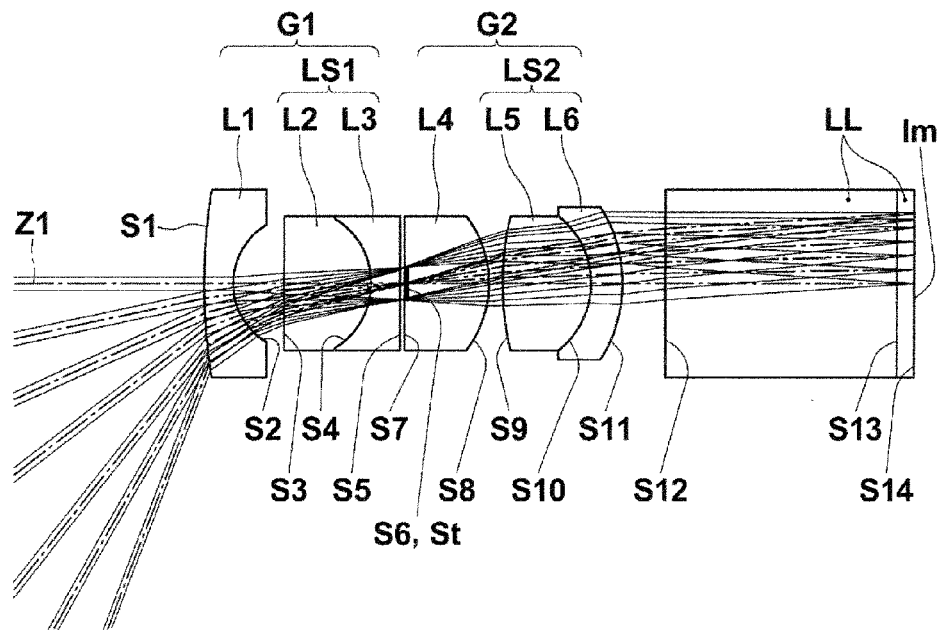
FIG. 7 is a sectional diagram that illustrates the schematic configuration of an objective optical system of Example 6 along with the paths of light rays.

FIG. 7 is a sectional diagram that illustrates the schematic configuration of an objective optical system of Example 6 along with the paths of light rays that pass through the objective optical system.

The objective optical system of Example 6 corresponds to the first through fourth embodiments described above, and is configured to satisfy all of Conditional Formulae (1) through (6). A cemented lens LS2 within a second lens group G2 of the objective optical system of Example 6 is the same as that of Example 1. That is, the cemented lens LS2 is formed by a fifth lens L5 having a positive refractive power and a sixth lens L6, which is a meniscus lens having a negative refractive power and a convex surface toward the image side, provided in this order from the object side.

FIG. 15 is a collection of diagrams that illustrate aberrations of the objective optical system of Example 6.

Table 6 below shows lens data of the objective optical system of Example 6.

TABLE 6

Example 6: Lens Data

| Surface Number (i) | Radius of Curvature (Ri) | Distance (Di) | Ndj | vdj |
| --- | --- | --- | --- | --- |
| 1 | 4.9998 | 0.25 | 1.88300 | 40.80 |
| 2 | 0.5800 | 0.44 | | |
| 3 | ∞ | 0.75 | 1.72825 | 28.50 |
| 4 | −0.6452 | 0.25 | 1.88300 | 40.80 |
| 5 | ∞ | 0.04 | | |
| 6 (Aperture Stop) | ∞ | 0.00 | | |
| 7 | ∞ | 0.73 | 1.51633 | 64.10 |
| 8 | −0.9258 | 0.12 | | |
| 9 | 2.4390 | 0.76 | 1.62041 | 60.30 |
| 10 | −0.7143 | 0.27 | 2.10205 | 16.80 |
| 11 | −1.1886 | 0.37 | | |
| 12 | ∞ | 2.00 | 1.55920 | 53.90 |
| 13 | ∞ | 0.15 | 1.51633 | 64.10 |
| 14 | ∞ | 0.00 | | |

As can be understood from the lens data and the like, the objective optical system of Example 6 can be miniaturized without decreasing optical performance.

Example 7

Figure 8:
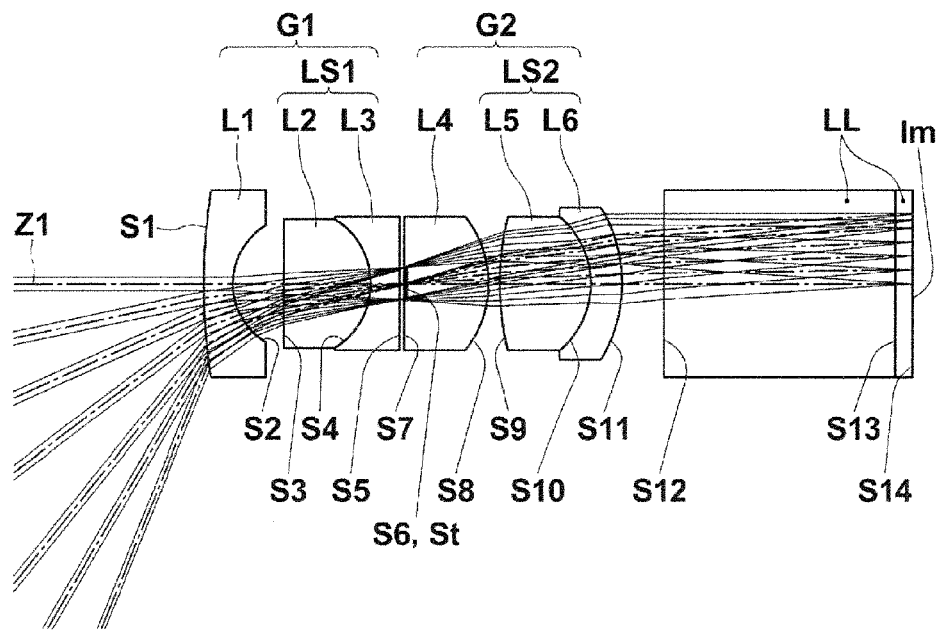
FIG. 8 is a sectional diagram that illustrates the schematic configuration of an objective optical system of Example 7 along with the paths of light rays.

FIG. 8 is a sectional diagram that illustrates the schematic configuration of an objective optical system of Example 7 along with the paths of light rays that pass through the objective optical system.

The objective optical system of Example 7 corresponds to the first through fourth embodiments described above, and is configured to satisfy all of Conditional Formulae (1) through (6). A cemented lens LS2 within a second lens group G2 of the objective optical system of Example 7 is the same as that of Example 1. That is, the cemented lens LS2 is formed by a fifth lens L5 having a positive refractive power and a sixth lens L6, which is a meniscus lens having a negative refractive power and a convex surface toward the image side, provided in this order from the object side.

FIG. 16 is a collection of diagrams that illustrate aberrations of the objective optical system of Example 7.

Table 7 below shows lens data of the objective optical system of Example 7.

As can be understood from the lens data and the like, the objective optical system of Example 7 can be miniaturized without decreasing optical performance.

Example 8

Figure 9:
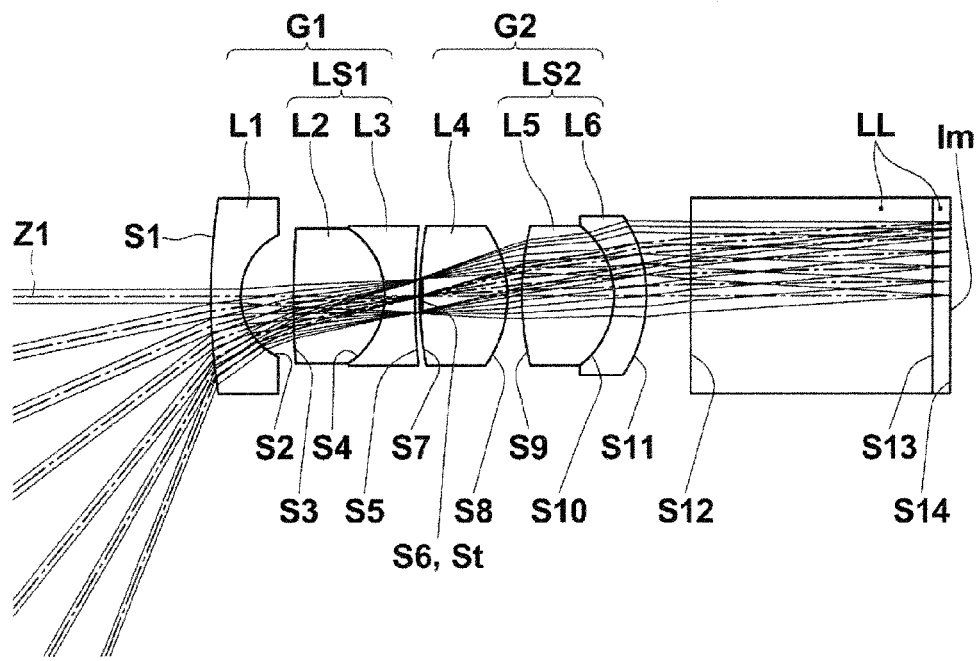
FIG. 9 is a sectional diagram that illustrates the schematic configuration of an objective optical system of Example 8 along with the paths of light rays.

FIG. 9 is a sectional diagram that illustrates the schematic configuration of an objective optical system of Example 8 along with the paths of light rays that pass through the objective optical system.

The objective optical system of Example 8 corresponds to the first through fourth embodiments described above, and is configured to satisfy all of Conditional Formulae (1) through (6). A cemented lens LS2 within a second lens group G2 of the objective optical system of Example 8 is the same as that of Example 1. That is, the cemented lens LS2 is formed by a fifth lens L5 having a positive refractive power and a sixth lens L6, which is a meniscus lens having a negative refractive power and a convex surface toward the image side, provided in this order from the object side.

FIG. 17 is a collection of diagrams that illustrate aberrations of the objective optical system of Example 8.

Table 8 below shows lens data of the objective optical system of Example 8.

TABLE 7

Example 7: Lens Data

| Surface Number (i) | Radius of Curvature (Ri) | Distance (Di) | Ndj | vdj |
| --- | --- | --- | --- | --- |
| 1 | 5.0988 | 0.25 | 1.88300 | 40.80 |
| 2 | 0.5800 | 0.44 | | |
| 3 | ∞ | 0.75 | 1.72825 | 28.50 |
| 4 | −0.6494 | 0.25 | 1.88300 | 40.80 |
| 5 | ∞ | 0.04 | | |
| 6 (Aperture Stop) | ∞ | 0.00 | | |
| 7 | ∞ | 0.73 | 1.51633 | 64.10 |
| 8 | −0.9072 | 0.10 | | |
| 9 | 2.4390 | 0.78 | 1.62041 | 60.30 |
| 10 | −0.7407 | 0.27 | 2.10205 | 16.80 |
| 11 | −1.2342 | 0.36 | | |
| 12 | ∞ | 2.00 | 1.55920 | 53.90 |
| 13 | ∞ | 0.15 | 1.51633 | 64.10 |
| 14 | ∞ | 0.00 | | |

TABLE 8

Example 8: Lens Data

| Surface Number (i) | Radius of Curvature (Ri) | Distance (Di) | Ndj | νdj |
|---|---|---|---|---|
| 1 | 4.9998 | 0.25 | 1.88300 | 40.80 |
| 2 | 0.5556 | 0.44 | | |
| 3 | 8.4585 | 0.75 | 1.72825 | 28.50 |
| 4 | −0.6565 | 0.25 | 1.88300 | 40.80 |
| 5 | 5.6421 | 0.04 | | |
| 6 (Aperture Stop) | ∞ | 0.00 | | |
| 7 | 3.0775 | 0.73 | 1.51633 | 64.10 |
| 8 | −0.9789 | 0.12 | | |
| 9 | 2.4390 | 0.76 | 1.62041 | 60.30 |
| 10 | −0.7143 | 0.27 | 2.10205 | 16.80 |
| 11 | −1.1813 | 0.37 | | |
| 12 | ∞ | 2.00 | 1.55920 | 53.90 |
| 13 | ∞ | 0.15 | 1.51633 | 64.10 |
| 14 | ∞ | 0.00 | | |

As can be understood from the lens data and the like, the objective optical system of Example 8 can be miniaturized without decreasing optical performance.

Table 9 below shows values related to the conditional formulae as described above.

TABLE 9

| Conditional Formula | Equation within Conditional Formula | Values of the Equations in the Examples | | | | | | | |
|---|---|---|---|---|---|---|---|---|---|
| | | Example 1 | Example 2 | Example 3 | Example 4 | Example 5 | Example 6 | Example 7 | Example 8 |
| (1) | f1/f | −1.31 | −1.31 | −1.3 | −1.31 | −1.31 | −1.32 | −1.31 | −1.24 |
| (2) | f4/f | 3.18 | 4.19 | 3.06 | 3.03 | 3.11 | 3.11 | 3.02 | 2.62 |
| (3) | f(RN)/f | −3.95 | −3.48 | −3.98 | −4.01 | −3.9 | −4.01 | −4.04 | −4.03 |
| (4) | f(RN)/f | −3.95 | −3.48 | −3.98 | −4.01 | −3.9 | −4.01 | −4.04 | −4.03 |
| (5) | f(RP)/f | 1.73 | 1.65 | 1.72 | 1.72 | 1.73 | 1.7 | 1.73 | 1.68 |
| (6) | f2 − 6/f | 1.99 | 2.03 | 1.98 | 1.97 | 1.97 | 2 | 1.98 | 2.05 |

The present invention has been described with reference to the embodiments and Examples thereof. However, the present invention is not limited to the embodiments and Examples described above, and various modifications are possible. For example, the values of the radii of curvature of each lens component, the distances among surfaces, the refractive indices, the Abbe's numbers, etc., are not limited to the numerical values indicated in connection with the Examples, and may be other values.

What is claimed is:

1. An objective optical system, comprising:
a first lens group having a negative refractive power;
an aperture stop; and
a second lens group having a positive refractive power, provided in this order from an object side;
the first lens group comprising a negative single lens and a cemented lens formed by cementing a positive lens and a negative lens together, provided in this order from the object side;
the second lens group comprising a positive single lens and a cemented lens formed by cementing a positive lens and a negative lens together, provided in this order from the object side; and
the objective optical system satisfying Conditional Formula (1b) below:

$$-1.4 < f1/f < -1.2 \tag{1b}$$

wherein f1 is the focal length of the lens provided most toward the object side, and f is the focal length of the entire lens system.

2. The objective optical system as defined in claim 1, wherein:
the cemented lens within the first lens group is formed by a positive lens having a convex surface toward the image side, and a negative lens, provided in this order from the object side.

3. The objective optical system as defined in claim 1, wherein:
the cemented lens within the second lens group is formed by a positive lens and a negative meniscus lens having a convex surface toward the image side, provided in this order from the object side.

4. The objective optical system as defined in claim 1, wherein:
the cemented lens within the second lens group is formed by a negative lens and a positive lens having a convex surface toward the image side, provided in this order from the object side.

5. The objective optical system as defined in claim 1, which is employed as an objective optical system of an endoscope.

6. An endoscope comprising:
an objective optical system as defined in claim 1.

7. The objective optical system as defined in claim 1 that satisfies Conditional Formula (2) below:

$$2.95 < f4/f \tag{2}$$

wherein f4 is the focal length of the positive single lens within the second lens group, and f is the focal length of the entire lens system.

8. The objective optical system as defined in claim 7 that satisfies Conditional Formula (2a) below:

$$3 < f4/f < 6 \tag{2a}$$

wherein f4 is the focal length of the positive single lens within the second lens group, and f is the focal length of the entire lens system.

9. The objective optical system as defined in claim 7 that satisfies Conditional Formula (2b) below:

$$3 < f4/f < 5 \quad (2b),$$

wherein f4 is the focal length of the positive single lens within the second lens group, and f is the focal length of the entire lens system.

10. The objective optical system as defined in claim 1 that satisfies Conditional Formula (3) below:

$$f(RN)/f < -3.6 \quad (3)$$

wherein f(RN) is the focal length of the negative lens in the cemented lens within the second lens group, and f is the focal length of the entire lens system.

11. The objective optical system as defined in claim 10 that satisfies Conditional Formula (3a) below:

$$-5 < f(RN)/f < -3.7 \quad (3a),$$

wherein f(RN) is the focal length of the negative lens in the cemented lens within the second lens group, and f is the focal length of the entire lens system.

12. The objective optical system as defined in claim 10 that satisfies Conditional Formula (3b) below:

$$-4.5 < f(RN)/f < -3.8 \quad (3b),$$

wherein f(RN) is the focal length of the negative lens in the cemented lens within the second lens group, and f is the focal length of the entire lens system.

13. The objective optical system as defined in claim 1, wherein:
    the first lens group comprises a negative single lens and a cemented lens having a negative refractive power, formed by cementing a positive lens and a negative lens together, provided in this order from the object side;
    the second lens group comprises a positive single lens and a cemented lens having a positive refractive power, formed by cementing a positive lens and a negative lens together, provided in this order from the object side; and
    the objective optical system simultaneously satisfies Conditional Formulae (4) and (5) below:

$$-5 < f(RN)/f < -2 \quad (4)$$

$$1.6 < f(RP)/f < 2 \quad (5)$$

wherein f(RN) is the focal length of the negative lens in the cemented lens within the second lens group, f(RP) is the focal length of the positive lens in the cemented lens within the second lens group, and f is the focal length of the entire lens system.

14. The objective optical system as defined in claim 13 that satisfies Conditional Formulae (4a) and (5a) below:

$$-4.5 < f(RN)/f < -2.5 \quad (4a)$$

$$1.64 < f(RP)/f < 1.9 \quad (5a),$$

wherein f(RN) is the focal length of the negative lens in the cemented lens within the second lens group, f(RP) is the focal length of the positive lens in the cemented lens within the second lens group, and f is the focal length of the entire lens system.

15. The objective optical system as defined in claim 13 that satisfies Conditional Formulae (4b) and (5b) below:

$$-4.3 < f(RN)/f < -3 \quad (4b)$$

$$1.66 < f(RP)/f < 1.85 \quad (5b),$$

wherein f(RN) is the focal length of the negative lens in the cemented lens within the second lens group, f(RP) is the focal length of the positive lens in the cemented lens within the second lens group, and f is the focal length of the entire lens system.

16. The objective optical system as defined in claim 1 that satisfies Conditional Formula (6) below:

$$1.92 < f2\text{-}6/f < 3 \quad (6)$$

wherein f2–6 is the combined focal length of the lenses other than the lens most toward the object side, and f is the focal length of the entire lens system.

17. The objective optical system as defined in claim 16 that satisfies Conditional Formula (6a) below:

$$1.92 < f2\text{-}6/f < 2.6 \quad (6a),$$

wherein f2–6 is the combined focal length of the lenses other than the lens most toward the object side, and f is the focal length of the entire lens system.

18. The objective optical system as defined in claim 16 that satisfies Conditional Formula (6b) below:

$$1.92 < f2\text{-}6/f < 2.2 \quad (6b),$$

wherein f2–6 is the combined focal length of the lenses other than the lens most toward the object side, and f is the focal length of the entire lens system.

* * * * *